United States Patent [19]

Han et al.

[11] Patent Number: 5,435,857
[45] Date of Patent: Jul. 25, 1995

[54] SOLDERING COMPOSITION

[75] Inventors: Tippy H. Han; Phodi Han, both of St. Charles, Ill.

[73] Assignee: Qualitek International, Inc., Addison, Ill.

[21] Appl. No.: 178,102

[22] Filed: Jan. 6, 1994

[51] Int. Cl.[6] .............................................. C22C 13/00
[52] U.S. Cl. ....................................... 148/24; 148/400; 420/562
[58] Field of Search ................... 420/562, 561, 589; 148/25, 400, 442, 24; C22C 13/00, 13/02

[56] References Cited

U.S. PATENT DOCUMENTS

| | | | |
|---|---|---|---|
| 2,157,933 | 5/1939 | Hensel et al. | 75/245 |
| 2,623,273 | 12/1952 | Murray et al. | 428/645 |
| 3,503,721 | 3/1970 | Lupfer | 428/633 |
| 3,909,312 | 9/1975 | Colombie | 148/24 |
| 4,373,974 | 2/1983 | Barajas | 148/24 |
| 4,670,217 | 6/1987 | Henso et al. | 420/572 |
| 4,695,428 | 9/1987 | Ballentine et al. | 420/561 |
| 4,758,407 | 7/1988 | Ballentine et al. | 420/560 |
| 4,806,309 | 2/1989 | Tulman | 420/562 |
| 4,919,729 | 4/1990 | Elmgren et al. | 148/24 |
| 4,929,423 | 5/1990 | Tucker et al. | 420/561 |
| 4,966,142 | 10/1990 | Zimmerman et al. | 228/263.12 |
| 4,980,243 | 12/1990 | Malikowski et al. | 428/621 |
| 5,077,005 | 12/1991 | Kato | 420/469 |
| 5,120,498 | 6/1992 | Cocks | 420/580 |
| 5,256,370 | 10/1993 | Slattery et al. | 420/557 |

FOREIGN PATENT DOCUMENTS 4-002739 1/1992 Japan .

OTHER PUBLICATIONS

Stevens et al., "Indium and Bismuth", *Indium Corporation of America*, pp. 750–757.
"Soldering of Electronic Products", *Lead Industries Association Inc.* (1991), pp. 9–14.
"Guide to Indalloy Specialty Alloys", *Indalloy Specialty Solders & Alloys*, Indium Corporation of America, Utica, N.Y.

*Primary Examiner*—David A. Simmons
*Assistant Examiner*—Sean Vincent
*Attorney, Agent, or Firm*—Speckman, Pauley & Fejer

[57] ABSTRACT

A soldering composition consisting essentially of an alloy comprising tin, indium, antimony, silver and in the range of 0.0% to about 10.5% by weight bismuth.

3 Claims, No Drawings

SOLDERING COMPOSITION

BACKGROUND OF THE INVENTION

1. Field of the Invention

This invention relates to a lead-free soldering composition, in particular, a lead-free soldering composition suitable for soldering components in electronic and microelectronic circuitry.

2. Description of Prior Art

Soldering compositions or alloys are low-melting-temperature conducting alloys which join two (2) conductors by wetting their surfaces and then solidifying to a mechanically strong solid. Solders loose their mechanical strength above a solidus temperature and become sufficiently fluid at about 50° C. above a liquidus temperature. Solders suitable for use in electronic applications should he strong and creep and corrosion-resistant and should he reasonable electrical conductors. Due to the characteristics thereof, lead-tin solders are most commonly used for electronic applications. The eutectie composition (63% Sn—37% Pb) has good mechanical properties combined with high wetability. We are unaware of any lead-free solders having characteristics similar to lead-tin solders suitable for use in electronic applications. It is, indeed, unexpected and unanticipated that the solder of this invention, being a lead-free solder, is suitable for use in electronic applications.

It is particularly surprising because the lead-free solder of this invention requires no additional components, such as viscosity controlling agents. For example, the "Guide to INDALLOY Specialty Solders" lists 223 solder compositions, only three (3) of which operate within the temperature range of 188° C. to 197° C., all of which contain lead.

It will also be apparent to those skilled in the art that the interaction between the elements of an alloy, particularly with respect to producing an alloy having the properties required for soldering electronic components, is not predictable, nor can such interaction be determined on the basis of known existing empirical data. That is, the properties of an alloy produced by mixing two or more known elements cannot be predicted based upon knowledge of the properties of the individual elements.

U.S. Pat. No. 4,373,974 teaches a solder composition or a solder cream for soldering components in electronic circuitry in which finely divided solder metals, such as tin and lead, are disbursed in a vehicle containing viscosity controlling agents, organic solvents, and a rosin or rosin derivative as a flux. The vehicle for the solder metals of the solder composition is a liquid composition having desirable viscosity characteristics and which maintains the solder metals in suspension without settling of the fine solder metal particles. U.S. Pat. No. 4,919,729 teaches a solder paste for use in a reducing atmosphere, the solder including a polyhydric alcoholic binder which vaporizes or decomposes before the solder liquifies during heating and a solder powder containing at least two (2) of the elements tin, bismuth, cadmium, antimony, indium, lead, silver, and gold. The polyhydric alcoholic binder is required to reduce solder splattering during heating. The solder paste is reflowed in a reducing atmosphere which serves as a flux.

U.S. Pat. No. 5,120,498 teaches a solder composition in which heavy metal solder compositions consisting of alloys from within the heavy metal system Pb-Sn-In-Bi-Cd-Sb-Hg-Ga-Ag-Au are combined with a small amount of a light reactive metal selected from the group consisting of lithium, sodium, potassium, rubidium, cesium, calcium, and magnesium. The solders in accordance with this patent have exceptional ability to wet non-metals, in particular glass.

U.S. Pat. No. 4,929,423 teaches a solder containing a lead-free alloy for use as a plumbing solder comprising bismuth, copper, silver, phosphorus, tin and a rare earth mixture. Similarly, U.S. Pat. No. 4,758,407 teaches a lead-free, cadmium free, tin and tin/antimony based solder alloy for joining copper tubes and brass pipe and fittings. U.S. Pat. No. 4,980,243 teaches a silver alloy solder for direct bonding of ceramic parts. U.S. Pat. No. 4,966,142 teaches an alloy for joining superconductive materials to themselves, conductive materials, or semiconductive materials, having 10 to 90 atomic percent indium combined with mercury, gallium, bismuth, cadmium, tin, or lead. U.S. Pat. No. 5,077,005 teaches a high-conductivity copper alloy for forming wires, the alloy containing copper and at least one of indium, cadmium, antimony, bismuth, titanium, silver, tin, lead, zirconium, and hafnium. Finally, U.S. Pat. No. 3,909,312 teaches a non-corrosive flux for relatively soft solders comprising a mixture of ammonia phosphates, ammonia fluoride, and a resin.

None of the prior art references of which we are aware teach or suggest a lead-free solder suitable for use in electronic applications and, in particular, suitable as a replacement for the most commonly used lead-tin solders, in particular a 63% Sn—37% Pb solder.

SUMMARY OF THE INVENTION

It is an object of this invention to provide a lead-free soldering composition suitable for use in electronic and microelectronic applications.

It is another object of this invention to provide a lead-free soldering composition suitable as a replacement for lead-based solders, and in particular, a 63% Sn—37% Pb soldering composition.

It is yet another object of this invention to provide a lead-free soldering composition having a solidus temperature of about 188° C. and a liquidus temperature of about 197° C.

These and other objects of this invention are achieved by a lead-free soldering composition comprising an alloy consisting essentially of tin (Sn), indium (In), antimony (Sb), silver (Ag) and in the range of 0.0% to about 10.5% by weight bismuth (Bi). As used throughout the specification and claims, by the term "soldering composition" we mean a fusible alloy in any form, including but not limited to bars, paste and wire, suitable for joining adjacent surfaces of less fusible metals or alloys.

In accordance with a particularly preferred embodiment of this invention, the alloy comprises in the range of about 86% to about 88% by weight tin, in the range of about 10.5% to about 11.5% by weight indium, in the range of about 0.4% to about 0.8% by weight antimony, and in the range of about 1.7% to about 2.3% by weight silver.

DESCRIPTION OF PREFERRED EMBODIMENTS

The lead-free soldering composition in accordance with this invention has a liquidus temperature of about 200° C. and a solidus temperature of about 170° C. This temperature range is critical with respect to use of the composition for soldering electronic and microelectronic component connections. While liquidus and solidus temperatures outside of these ranges may be employed in soldering electronic component connections, the risk of damage to the electronic components or the formation of improper solder joints is substantially increased. In addition, higher temperature ranges are impractical due to difficulties in generating the required higher temperatures. Accordingly, soldering compositions having solidus and liquidus temperatures outside of the range of about 170° C. to 200° C. are considered to be less suitable for use in electronic applications.

It is generally desirable that the plastic range of a soldering composition, that is, the temperature range between the solidus and liquidus temperatures be as small as possible to ensure good solder joints. Accordingly, in accordance with a preferred embodiment, the lead-free soldering composition of this invention has a liquidus temperature of about 197° C. and a solidus temperature of about 188° C.

The preferred soldering composition in accordance with this invention is a lead-free soldering composition comprising an alloy consisting essentially of about 87.0% by weight tin (Sn), about 11.0% by weight indium (In), about 0.6% by weight antimony (Sb), and about 2.0% by weight silver (Ag). Variations within very narrow limits of the composition of the alloy in accordance with this invention may be made, still resulting in a soldering composition having the desired characteristics. Thus, the amount of Sn in the alloy may be varied in the range of about 86% to about 88% by weight of the alloy; the amount of In may be varied in the range of about 10.5% to about 11.5% by weight of said alloy; the amount of Sb may be varied in the range of about 0.4% to about 0.8% by weight of said alloy; and the amount of said Ag maybe varied in the range of about 1.7% to about 2.3% by weight of said alloy. Each element of the soldering composition in accordance with this embodiment of the invention can be varied within the ranges stated hereinabove; however, the sum of the amounts of the individual elements of the composition must be maintained at 100% subject, of course, to trace amounts of impurities which may be present in the composition. For example, if the amount of indium is varied, the amount of tin is preferably varied in an opposing amount to maintain the sum of the elements of said composition at 100%. Similarly, if the amount of antimony is varied, the tin is preferably varied in an opposing amount to maintain the sum of the elements of said composition at 100%.

In accordance with another embodiment of this invention, the soldering composition comprises an alloy consisting essentially of tin (Sn), indium (In), antimony (Sb), silver (Ag) and up to about 10.5% by weight bismuth (Bi). The addition of bismuth to the alloy is made for the purpose of reducing the solidus and liquidus temperatures of the soldering composition. Thus, where the amounts of tin, indium, antimony, and/or silver are varied within the ranges stated hereinabove, and the solidus and liquidus temperatures of the resulting composition fall above the desired temperature range, bismuth may be added to the composition to reduce the temperatures thereof and bring the solidus and liquidus temperatures of the soldering composition back into the desired temperature range. However, it should be noted that the addition of bismuth undesirably increases the brittleness of the soldering composition. Thus, additions of bismuth above about 10.5% by weight of the soldering composition are undesirable.

In addition, to compensate for the addition of bismuth to the soldering composition, the amounts of the remaining elements of the alloy may be reduced proportionately to accommodate the addition of the bismuth, or alternatively, the amount of tin alone may be reduced to compensate for the addition of bismuth. In either case, the sum of the elements of the composition must be 100%.

In accordance with another preferred embodiment of this invention, the soldering composition consists essentially of an alloy comprising tin, indium, antimony, silver, and in the range of 0.0% to about 10.5% by weight bismuth, and a flux. The purpose of the flux is to reduce surface tension between the soldering composition and the components to be soldered, thereby, enhancing the acceptance of the soldering composition by the electronic components. It is to be noted, however, that the soldering composition of this invention is operable without a flux and, thus, the addition of a flux is not a requirement for operability. Suitable fluxes include water soluble organic compounds, resins, rosins, and derivatives and mixtures thereof.

Table 1 shows the liquidus and solidus temperatures of a soldering composition in accordance with one embodiment of this invention compared to the liquidus and solidus temperatures of soldering compositions having amounts of tin, indium, antimony, and silver outside of the ranges disclosed hereinabove. It can be seen from the data shown in Table 1 that the relative amounts of the elements comprising the soldering composition of this invention are critical to providing a soldering composition with liquidus and solidus temperatures suitable for use in electronic applications and, in particular, within the ranges of 170° C. to 200 ° C. It can be seen, for example, that even minor deviations in composition from the soldering composition of this invention result in liquidus and/or solidus temperatures outside of the desired range.

TABLE 1

| Soldering Composition | Liquidus, °C. | Solidus, °C. |
| --- | --- | --- |
| 87.1% Sn/10.5% In/2.0% Ag/0.4% Sb | 197 | 188 |
| 87.0% Sn/10.5% In/2.0% Ag/0.5% Sb | 200 | 190 |
| 86.2% Sn/11.5% In/2.0% Ag/0.3% Sb | 200 | 190 |
| 79.0% Sn/9.5% In/1.8% Ag/ 0.5 % Sb/9.0% Bi | 191 | 180 |
| 86.5% Sn/10.5% In/2.0% Ag/1.0% Sb | 206 | 196 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A soldering composition consisting essentially of an alloy of tin (Sn) in the range of about 86.0% to about 88.0% by weight of said alloy, indium (In) in the range of about 10.5% to about 11.5% by weight of said alloy, antimony (Sb) in the range of about 0.4% to about 0.8% by weight of said alloy, silver (Ag) in the range of about 1.7% to about 2.3% by weight of said alloy, bismuth (Bi) in the range of 0.0% to about 10.5% by weight of said alloy, and having a plastic temperature range of about 170° C. to about 200° C.

2. A soldering composition consisting essentially of an alloy consisting essentially of tin (Sn) in the range of about 86% to about 88% by weight of said alloy, indium (In) in the range of about 10.5% to about 11.5% by weight of said alloy, antimony (Sb) in the range of about 0.4% to about 0.8% by weight of said alloy, silver (Ag) in the range of about 1.7% to about 2.3% by weight of said alloy, bismuth (Bi) in the range of 0.0% to about 10.5% by weight of said alloy, a flux, and having a plastic temperature range of about 170° C. to about 200° C.

3. A soldering composition in accordance with claim 2, wherein said flux is selected from the group consisting of a resin, a rosin, a water soluble organic compound, and mixtures thereof.

* * * * *